(12) United States Patent
Peddada

(10) Patent No.: US 7,447,940 B2
(45) Date of Patent: Nov. 4, 2008

(54) SYSTEM AND METHOD FOR PROVIDING SINGLETON SERVICES IN A CLUSTER

(75) Inventor: Prasad Peddada, Fairfield, CA (US)

(73) Assignee: BEA Systems, Inc., San Jose, CA (US)

( * ) Notice: Subject to any disclaimer, the term of this patent is extended or adjusted under 35 U.S.C. 154(b) by 0 days.

(21) Appl. No.: 11/396,826

(22) Filed: Apr. 3, 2006

(65) Prior Publication Data

US 2007/0174661 A1 Jul. 26, 2007

Related U.S. Application Data

(60) Provisional application No. 60/740,582, filed on Nov. 29, 2005.

(51) Int. Cl.
*G06F 11/00* (2006.01)
(52) U.S. Cl. .............................. 714/11; 714/4; 714/10; 714/12; 714/13; 709/223; 709/224
(58) Field of Classification Search .............. 714/10–13
See application file for complete search history.

(56) References Cited

U.S. PATENT DOCUMENTS

| | | | | |
|---|---|---|---|---|
| 6,108,300 | A * | 8/2000 | Coile et al. | ................. 370/217 |
| 6,643,795 | B1 | 11/2003 | Sicola et al. | |
| 6,757,708 | B1 | 6/2004 | Craig et al. | |
| 7,007,042 | B2 | 2/2006 | Lubbers et al. | |
| 2002/0131423 | A1 * | 9/2002 | Chan et al. | ................. 370/400 |
| 2004/0044755 | A1 | 3/2004 | Chipman | |
| 2005/0021848 | A1 | 1/2005 | Jorgenson | |
| 2005/0132154 | A1 * | 6/2005 | Rao et al. | ................... 711/162 |
| 2005/0193245 | A1 | 9/2005 | Hayden et al. | |
| 2005/0283641 | A1 * | 12/2005 | Clark et al. | .................... 714/4 |
| 2006/0112244 | A1 | 5/2006 | Buah et al. | |
| 2006/0190766 | A1 * | 8/2006 | Adler et al. | ................... 714/13 |
| 2006/0195560 | A1 * | 8/2006 | Newport | ...................... 709/223 |

OTHER PUBLICATIONS

Notification of Transmittal of the International Search Report and the Written Opinion of the International Searching Authority, or the Declaration, Dated Oct. 18, 2006 in re PCT Application No. PCT/US06/12412.

* cited by examiner

*Primary Examiner*—Emerson C Puente
(74) *Attorney, Agent, or Firm*—Fliesler Meyer LLP

(57) ABSTRACT

A system and method for providing singleton services in a cluster of servers, where one server is designated as a cluster master, other servers are designated as migratable servers and where all servers in the cluster heartbeat their liveness information against a database. The cluster master monitors the heartbeats of all migratable servers. Upon failure of a migratable server's heartbeat, the cluster master first attempts to restart the migratable server on the same machine and if that does not succeed, the cluster master migrates the migratable server to a different machine in the cluster. In accordance with an embodiment, all migratable servers monitor the heartbeats of the cluster master. Upon failure of the cluster master's heartbeating, one migratable server takes over the role of being cluster master.

19 Claims, 7 Drawing Sheets

SYSTEM AND METHOD FOR PROVIDING SINGLETON SERVICES IN A CLUSTER

CLAIM OF PRIORITY

This application claims the benefit of U.S. Provisional Patent Application No. 60/736,718; entitled "SYSTEM AND METHOD FOR PROVIDING SINGLETON SERVICES IN A CLUSTER"; inventor Prasad Peddada; filed Nov. 15, 2005, and incorporated herein by reference.

CROSS-REFERENCE TO RELATED APPLICATIONS

This application is related to U.S. patent application "SYSTEM AND METHOD FOR ENABLING SITE FAILOVER TN AN APPLICATION SERVER ENVIRONMENT"; Inventor: Prasad Peddada; Ser. No. 11/396,517; Filed Apr. 3, 2006, which claims the benefit of U.S. provisional patent application "SYSTEM AND METHOD FOR ENABLING SITE FAILOVER IN AN APPLICATION SERVER ENVIRONMENT"; Inventor: Prasad Peddada; Ser. No. 60/740,582; Filed Nov. 29, 2005, both of which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to servers, clusters and deployment of various services on server clusters; and in particular to systems and methods for providing highly available and migratable servers which offer singleton services across a cluster of application servers.

BACKGROUND

Clustering of servers is becoming increasingly important in a wide variety of contexts, for reasons of increased functionality, higher levels of services and availability, in addition to supporting server failover. Many businesses that employ computer systems require such connectivity between servers in order to ensure the durability and improved services of the network, intranet or website employed. As referred to herein, clustering refers to a group of one or more servers, (usually called "nodes"), that work together and generally represent themselves as a single virtual server to the network. In other words, when a client connects to a set of clustered servers, it thinks that there is only a single server, rather than a plurality. When one node fails, that nodes responsibilities are taken over by another node, thereby boosting the reliability of the system.

Traditionally, all services on such a cluster have been deployed homogenously on all of the servers in the cluster. This has satisfied most demands, in that when one server fails, another server is providing the same services, and thus a client can still access those-services. However, sometimes there is a set of stateful services that need to be run on only one server in the cluster at any given time, with the ability to automatically migrate the service in the event of server failures. For example, the Java Messaging Service (JMS) subsystem guarantees that user-generated client subscriber identifiers (ids) are unique within the cluster. In order to honor such requirements, a JMS or similar service that runs on only one node in the cluster is required. These types of services are, for the purposes of this disclosure, referred to as "singleton services", by which it is meant that the service has a single active instance in the cluster.

A singleton service should be migrated in the event of a hosting server failure. With a traditional approach, migratable, singleton services were manually targeted to a server in the cluster, and the administrator did the migration manually. This type of resolution is lacking in that it is complex, time consuming and tedious on the system administrators. In addition, the downtime of the service provided can be quite lengthy.

A new approach is desired, one which would automatically target and distribute singleton services across the servers in the cluster, in addition to migrating them automatically in the event of server failures. However, there are two sets of problems that make it difficult to provide such automation. First, when a server becomes temporarily frozen or disconnected from the cluster and is mistakenly judged to have failed, then the service may be migrated to a new server, and subsequently the original server may rejoin the cluster. In that instance, two servers would be providing the singleton service. Second, if a server is incorrectly assumed to be alive, then none of the servers in the cluster would be providing the singleton service.

SUMMARY

Embodiments of the present invention include systems and methods for providing singleton services within a network of servers, a cluster of servers, or some other group of servers, and for automatically migrating those services across the machines in the network, cluster, or group. The term "machine," for the purposes of this disclosure, means any computer system capable of maintaining a server or providing some type of service. Examples are personal computers, workstations, mainframes and other computers that can be connected to a network or cluster. The server migration or clustering infrastructure can guarantee that each migratable service is active on only one node in the cluster at all times. When a service fails, the server hosting that service can be isolated or quarantined from making any further changes. In order to prevent the problems of auto-migration described above, the present methodology can perform three tasks: First, a judgment can be made as to whether a server has failed; Second, the seemingly failed server can be isolated from disks and other non-client entities connected to it, preventing it from making changes; Third, the seemingly failed server can be restarted on the machine upon which it sits or, if that cannot be achieved, the server can be migrated to another machine, so that the services can be still made available to clients and other servers.

DETAILED DESCRIPTION

Figure 1:
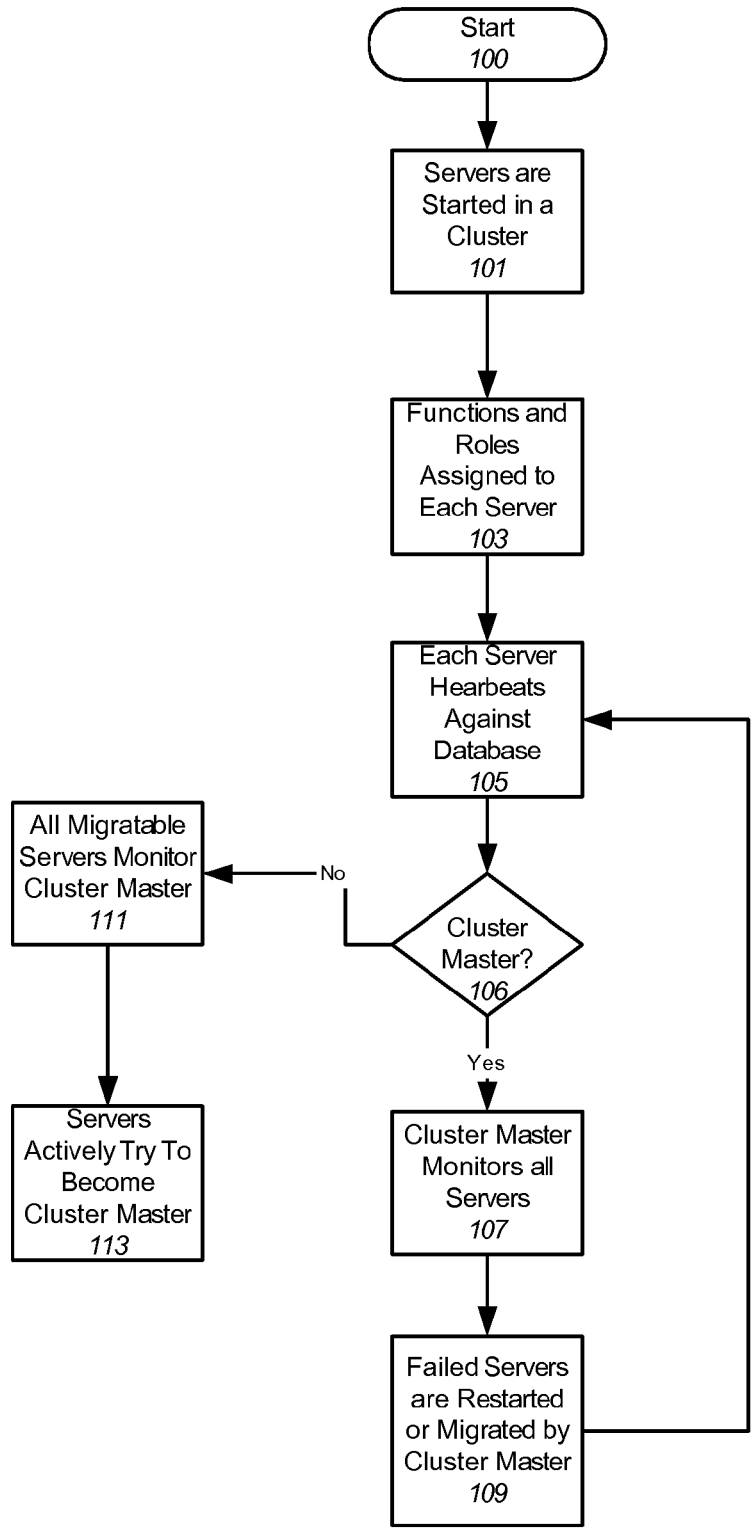
FIG. 1 is a flow chart of a process defining the overall functionality of providing singleton services in a cluster by implementing migratable servers, in accordance with certain embodiments of the invention.

Embodiments of the present invention include systems and methods for providing singleton services within a network of servers, a cluster of servers, or some other group of servers, and for automatically migrating those services across the machines in the network, cluster, or group. The term "machine," for the purposes of this disclosure, means any computer system capable of maintaining a server or providing some type of service. Examples are personal computers, workstations, mainframes and other computers that can be connected to a network or cluster. The server migration or clustering infrastructure can guarantee that each migratable service is active on only one node in the cluster at all times. When a service fails, the server hosting that service can be isolated or quarantined from making any further changes. In order to prevent the problems of auto-migration described above, the present methodology can perform three tasks: First, a judgment can be made as to whether a server has failed; Second, the seemingly failed server can be isolated from disks and other non-client entities connected to it, preventing it from making changes; Third, the seemingly failed server can be restarted on the machine upon which it sits or, if that cannot be achieved, the server can be migrated to another machine, so that the services can be still made available to clients and other servers.

Aspects of the invention are illustrated by way of example and not by way of limitation in the figures of the accompanying drawings in which like references indicate similar elements. It should be noted that references to "an", "one" and "various" embodiments in this disclosure are not necessarily to the same embodiment. In the following description, numerous specific details are set forth to provide a thorough description of the invention. However, it will be apparent to one skilled in the art that the invention may be practiced without these specific details.

Various embodiments include a highly available database and a node manager in order to implement server migration. The database can also be a file storage or other reliable means of maintaining information. A server, for purposes of this disclosure can be any type of an application server that provides some type of a service, resource or application. As one non-limiting example, Web Logic® Server, available from BEA Systems, can be implemented. As also described herein, a migratable server is a server in a cluster, network, or group of servers, which hosts a singleton service or services that are required to be highly available. Any of the servers in the cluster, network, or group of computers can be tagged as migratable, depending on the customer's needs, and these migratable servers can be made to host a variety of both singleton and non-singleton services. Each migratable server can be assigned a unique identifier (id) or name. Servers in the group of servers, other than migratable servers, are sometimes referred to herein as "pinned" servers.

FIG. 1 is a flow diagram illustration of a process defining the overall functionality of providing singleton services in a cluster via migratable servers, in accordance with various embodiments of the invention. Although FIG. 1 depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

The process begins at step 100. In step 101, the various servers can be started in a network or in a cluster form (i.e. as nodes in the cluster) by the administration (admin) server. The admin server is responsible for starting the servers initially, and for stopping the servers finally. Its role can also be to coordinate any manual migration by system administrators, in addition to any kind of changing of configuration of servers.

In step 103, as the servers are being started, each server can assume a role. For example, the first server started can take the role of being the cluster master. In accordance with an embodiment, each server seeks to attain the role of cluster master; hence the first server that starts is usually the server that attains this role. The cluster master is subsequently responsible for restarting, and if necessary migrating any servers that have failed. Usually a cluster would require the services of a cluster master if at least one of the managed servers in the cluster were tagged as a migratable server. The rest of the servers that are starting up can then take the role of being either a migratable server, or a non-migratable server (a "pinned" server), according to the particular needs of the enterprise operating the cluster (the customer). In accordance with an embodiment, each of the servers have the ability to take over the role of cluster master at some subsequent point in time. Similarly, the cluster master can from time to time also act as a migratable server, or a non-migratable server.

In step 105, all of the servers in the cluster periodically renew their lease within a database, i.e. they "heartbeat" against the database. By the term "heartbeating" it is meant that the server is continuously renewing its liveness information in the database or file storage. This process can be implemented by assigning a table entry to each server, which the server then must update after every certain time period expires. The time period required for updating the table entry can be arbitrarily chosen, or can be defined according to the servers and database implemented, in order to maximize performance. For example, a time period of 30,000 milliseconds can be selected. Thus, if a server does not update the table entry in the database after the expiration of the defined time period, then the server has failed to heartbeat, and it could be assumed that there has occurred a crash, server hang or some other type of failure. The database, for purposes of this invention, can be any database, file system or other form of information storage, capable of storing some form of entry for each server. However, the database, file system, file, or other form of information storage, should be made highly available in order to boost the reliability of the cluster and of the services provided. For example, the database can be selected from various products offered by companies such as Oracle, Microsoft, Sybase and IBM. It should be noted that the migration capability of the servers, and consequently the providing of singleton services, depends to a large extent on the integrity of the database, so a reliable database should be selected.

In step 106, the further functionality of each server can be determined by the role that was assigned to it in step 103. Thus, a server that is assigned the role of the cluster master can be responsible for performing one set of functions, while all migratable servers can perform another, all as described in further detail below.

In step 107, as the cluster master is heartbeating against the database, it also monitors the heartbeats of all other servers in the cluster. This can be implemented by various functions, including but not limited to having the cluster master read all of the table entries in the database whenever it accesses the database to heartbeat. Thus, if some server has failed to heartbeat, the cluster master should notice that the corresponding lease has not been renewed in the database.

In step 109, the cluster master checks to see if any lease has expired (and in doing so can notice a failed server as described above). It can then take the necessary steps to restart the failed server on the same machine. If the failed server does not restart within a configurable number of attempts, the cluster master can migrate the failed server to a different machine in the cluster. The cluster master can first attempt to restart the failed server on the same machine by calling the node manager. The node manager can be a software program that runs on all of the machines in cluster; and is capable of adding and deleting internet protocol (IP) addresses for the servers on those machines. The node manager should also be capable of being invoked remotely by the cluster master. Any programming framework can be used in order to impart this functionality upon the node manager, including but not limited to scripts for Unix or Microsoft Windows operating systems.

If the cluster master cannot restart the failed server on the same machine, it can use the node manager to migrate the failed server to a different machine in the cluster. In certain embodiments, the Internet protocol (IP) address can be migrated along with the migratable failed server to another machine. This makes running various applications easier, because the service is resolvable, or appears transparent, within the network or cluster. From the clients' perspective, the client will always be connected to the same server, no matter where that server is within the cluster. Another advantage of IP migration is that the client need not know the physical location of the server; simply knowing the IP address of the server is enough. Thus the cluster master can invoke the machine's node manager (which can be local or remote) and have the node manager migrate the server to the new machine.

In step 111, each of the servers that are not currently acting as cluster master actively monitor the leases/heartbeats of the cluster master, while they themselves are heartbeating against the database. This can be implemented similarly to the monitoring ability of the cluster master, or in some other form of a monitoring function.

In step 113, if the cluster master were to fail its heartbeat, then any of the other servers can notice that failure. The first server to notice can then take over the role of being cluster master. In effect, all servers can be actively trying to become the cluster master at all times. Whenever a server (migratable or non-migratable) becomes a new cluster master, it assumes all the functions and duties of the original cluster master. No further migration is necessary at this point. In the alternative, the cluster can be configured to freeze whenever the cluster master fails, until a system administrator reboots or reconfigures the cluster master; however this type of implementation is not very efficient in production environments, since it forces the cluster to be dependent upon the performance of one server, namely the cluster master.

Figure 2:
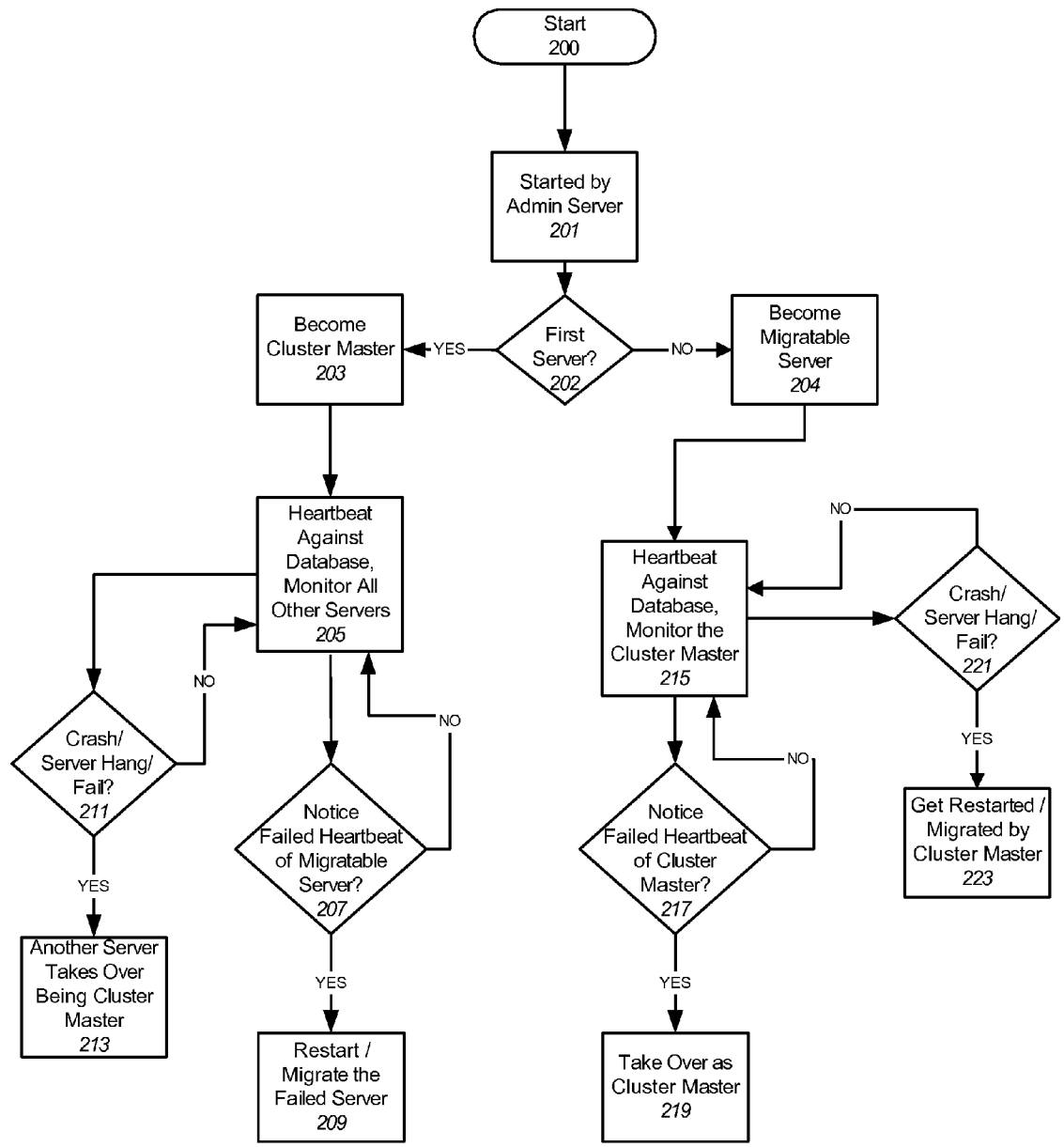
FIG. 2 is a flow chart of a process defining an exemplary functionality of one server in the cluster, in accordance with certain embodiments of the invention.

FIG. 2 is a flow diagram illustration of a process defining an exemplary functionality of one server in the cluster, in accordance with various embodiments of the invention. Although FIG. 2 depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

The process begins in step 200. In step 201, a server in the cluster is initially started by the admin server and joins the cluster. It can then be determined, in step 202, whether the server is the first server in the cluster.

In step 203, if a server is the first server joining the cluster, then the server can assume the role of cluster master. In step 205, the cluster master can then begin to renew its lease (heartbeat), as evidence by its entry in the database, file storage, or other record-keeping. At the same time, the cluster master can monitor the leases of migratable servers in the database, noticing any failures to heartbeat by any migratable server. Two things can occur from that point on: the cluster master can notice that a migratable server has failed, or the cluster master can fail itself.

In step 207, if the cluster master notices that a migratable server has failed to heartbeat, it can assume that the migratable server has crashed or has failed in some other manner. Consequently it can be assumed that the failed server is not responding and therefore not providing the singleton services that it is supposed to be providing. In step 209, the cluster master can then take steps to migrate the failed migratable server to another machine. The cluster master can first attempt to restart the failed server on the same machine and if that attempt fails, it can then call the node manager in order to migrate the server to another machine. The cluster master can subsequently migrate the failed server to another machine.

Alternatively, in step 211, the cluster master itself can fail to heartbeat because of a crash, server hang or some other type of failure. However, since all migratable servers are always actively trying to become cluster themselves, once the original cluster master fails to heartbeat, the first migratable server available can take over the role of being cluster master, as illustrated in step 213.

Returning to step 202, if the server is not the first server to join the cluster, it would not typically be assigned the role of cluster master. Instead, the server could become a migratable server, as illustrated in step 204. From that point on, the migratable server heartbeats against the database, and at the same time it is monitoring the heartbeat of the cluster master as illustrated in step 215. Thus, a migratable server can notice that the cluster master has failed, or the migratable server can fail itself.

In step 217, if the migratable server notices that the cluster master failed to heartbeat, it actively attempts to become the cluster master itself, i.e. it attempts to take over the role of cluster master and assume its functions as illustrated in step 219.

In step 221, the migratable server can itself fail to heartbeat because of a crash, server hang or some other failure. The failure to heartbeat is then noticed by the cluster master and the migratable server will get restarted on the same machine or migrated to a different machine by the cluster master, as illustrated in step 223.

Figure 3:
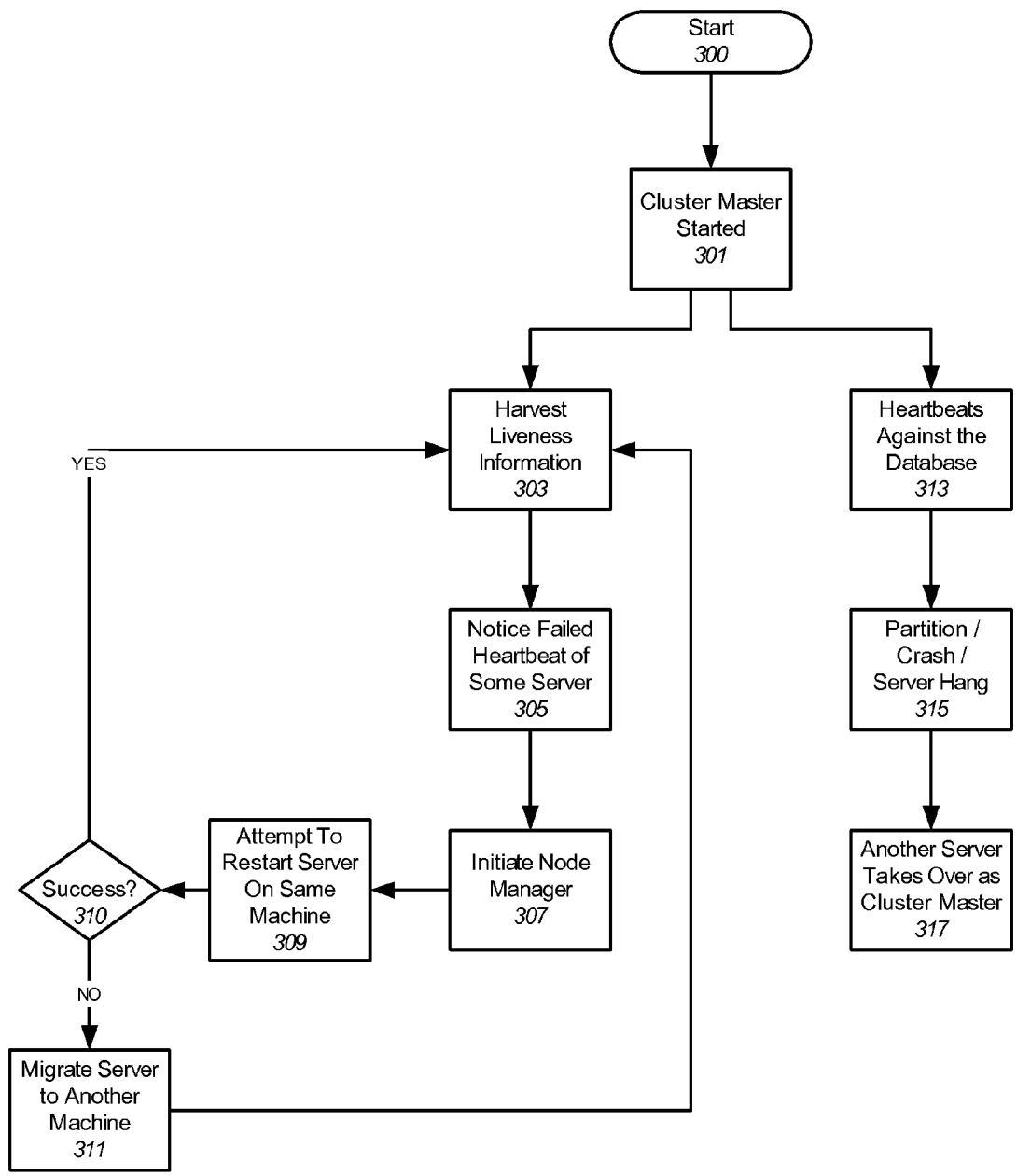
FIG. 3 is a flow chart of a process defining an exemplary functionality of a cluster master in the cluster, in accordance with certain embodiments of the invention.

FIG. 3 is a flow diagram illustration of a process defining an exemplary functionality of a cluster master in the cluster, in accordance with various embodiments of the invention. Although this figure depicts functional steps in a particular order for purposes of illustration, the process is not necessarily limited to any particular order or arrangement of steps. One skilled in the art will appreciate that the various steps portrayed in this figure can be omitted, rearranged, performed in parallel, combined and/or adapted in various ways.

The process begins at step 300. In step 301, a server is started or assumes the role of cluster master, as previously described above. It then begins to perform two functions either simultaneously or consecutively. The cluster master heartbeats against the database as illustrated in step 313, providing its liveliness information to it. In addition, the cluster master harvests the liveliness information of other migratable servers from the database, as illustrated in step 303.

If, as illustrated in step 315, the cluster master crashes, hangs, or fails in some other manner, one of the servers will take over its functions as illustrated in step 317. On the other hand, while the cluster master is harvesting liveliness information from the database, if the cluster master notices that a migratable server has failed to heartbeat (in step 305), it can then initiate the node manager in order to deal with this problem, as illustrated in step 307. In step 309, the cluster master will first attempt to restart the failed server on the same machine. In step 310, if that attempt is successful, the cluster master will go back to performing its usual functions, namely heartbeating against the database and monitoring the liveness of other migratable servers. If the attempt to restart was unsuccessful, then, in step 310, the cluster master will migrate the failed server onto a different machine, as illustrated in step 311. Subsequently the cluster master could go back to performing its duties of harvesting liveness information and heartbeating against the database.

Although not illustrated, the cluster master need not be made to wait for the node manager to complete the migration. After initiating the node manager, the cluster master is freed to go back to fulfilling its role of heartbeating and harvesting, as described above. Alternatively, the cluster master could be made to wait for the node manager on a failed server to finish its server migration process, before attempting to restart that server. Both alternatives are within the spirit of the invention, as will be apparent to one skilled in the art.

Figure 4:
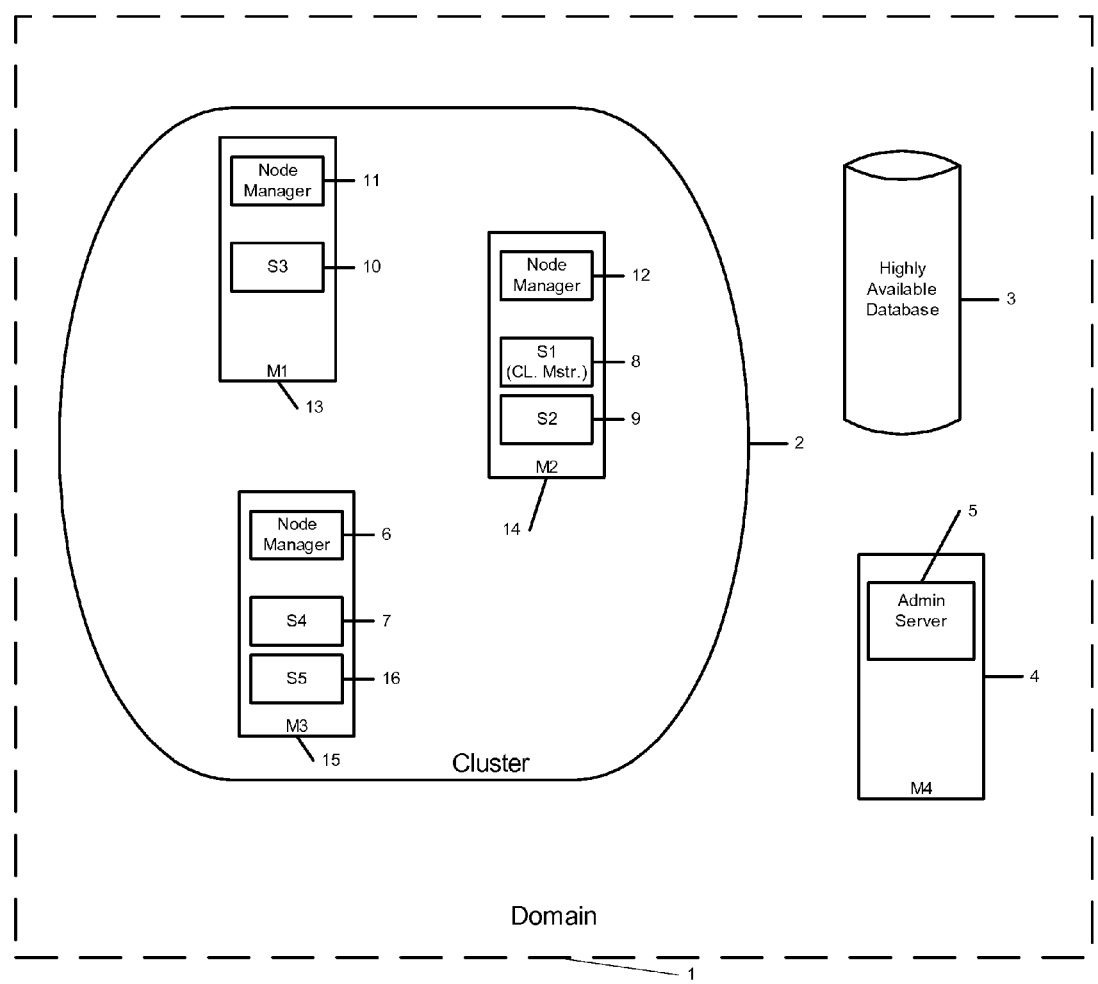
FIG. 4 is an illustration of the overall placement of a cluster of machines running servers, a node manager, a highly available database and an administration server, in accordance with certain embodiments of the invention.

FIG. 4 is an exemplary illustration of the overall placement of a cluster of machines running servers, a node manager, a highly available database and an administration (admin) server, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As shown in FIG. 4, each machine 13,14,15, in the cluster 2, can have one or more servers 7,8,9,10,16, running thereon. The machines can also have node manager 6,11,12, software deployed on them. The node manager should be capable of running customizable scripts or other programs in order to facilitate migration of the servers across machines. The node manager can be invoked remotely by the cluster master 8, in order to start and to stop (kill) various servers in the cluster.

The admin server 5 can be used to coordinate manual server migration and changing of configuration. It should also be used for the purpose of initially starting the servers. Similarly, it can be responsible for finally stopping all the servers in the cluster. In certain embodiments, the admin server is running on a separate machine 4, which is not part of the cluster, and is thus not migratable itself. An admin server can be implemented by another machine, a network computer, a workstation or some other means. It can be made accessible by system administrators and other persons who can subsequently coordinate manual migration of migratable servers within the cluster. The admin server is particularly useful in performing a graceful shutdown of the system, during which automatic service migration can be halted for the duration of the shutdown. The highly available database 3 need not necessarily be a traditional database, as already discussed above. Instead, it can be implemented as any type of file or information storage system; however it is preferable that it be highly available in order to boost reliability of the cluster and the singleton services.

As shown in FIG. 4, all of the components are illustrated as being part of one, i.e. a single domain 1. However this is done merely for purposes of illustration and ease of understanding. Multiple domains and subdomains can also be implemented.

Figure 5:
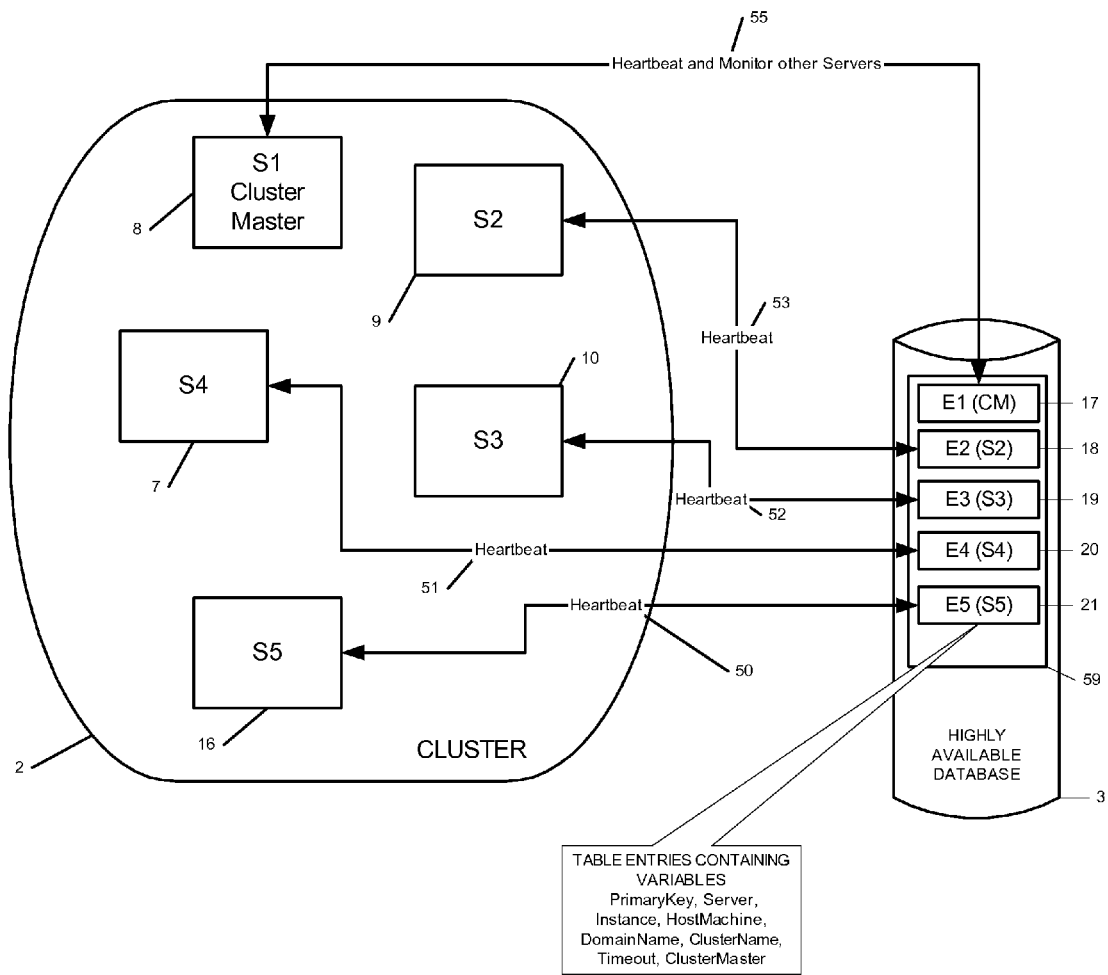
FIG. 5 is an illustration of a cluster of servers functioning against the database, in accordance with certain embodiments of the invention.

FIG. 5 is an exemplary illustration of a cluster of servers functioning against the database, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As shown in FIG. 5, in normal operation the cluster master 8 can be heartbeating 55 its liveness information to the highly available database 3. It can do this by continuously updating one of the entries (17-21) of a table 59 in the database, in order to check in. As an illustrative example, each table entry can have variables for storing the primary key, server name, server instance, host machine, domain name, cluster name, the timeout (check-in time period), and a variable to determine whether this particular server is the cluster master. Simultaneously, the cluster master can be monitoring the heartbeats 50, 51, 52, 53, of all of the other migratable servers 7,9,10,16, in the database. Once it notices that the lease for a migratable server has expired, i.e. it notices that a migratable server has stopped heartbeating, the cluster master can restart or migrate that server to another machine.

Similarly, all of the migratable servers 7,9,10,16, can be heartbeating (50-53) their own liveness information to the database by the same means as the cluster master 8. Each migratable server has an entry in the database corresponding to its liveness information, which the migratable server can be continuously updating. Simultaneously, each migratable server can be proactively attempting to take over the role of cluster master. Thus, if the cluster master were to fail its heartbeat, the first migratable server to notice this, will become cluster master itself.

It should be pointed out that in accordance with various embodiment, a single table need not necessarily be implemented in order to store the liveness information of the servers in the cluster. Multiple such tables can be used, or other types of data structures can be employed, including but not limited to lists, graphs or binary trees.

Figure 6:
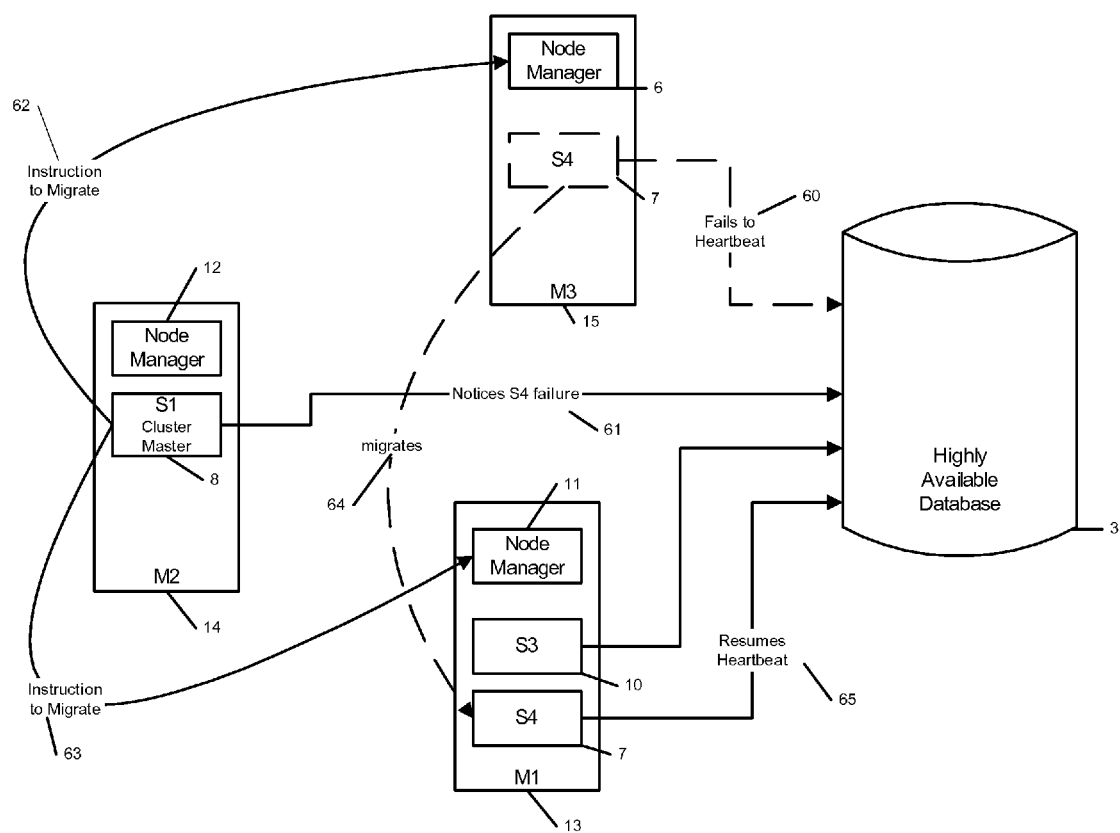
FIG. 6 is an illustration of a method of migrating the migratable server to a different machine within the cluster, in accordance with certain embodiments of the invention.

FIG. 6 is an exemplary illustration of a migration method and system, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As shown in FIG. 6, to begin with, each server depicted 7,8,10, is heart beating against the database 3. A first server S4 (7) can crash or fail and consequently it may stop sending its heartbeats 6 to the highly available database. A second server S1 (8), designated as the current cluster master, will notice 61 another server S4's failure to heartbeat, and then it will attempt to restart/migrate server S4. This figure illustrates one method of restarting or migration of S4 by the cluster master S1.

As shown in FIG. 6, the cluster master can send an instruction 62 to restart S4, to the node manager 6 installed upon the machine 15 that S4 is currently deployed on. However, because the machine itself may have crashed or frozen, the node manager installed therein may not receive the restart instruction sent by the cluster master. Thus, the cluster master will subsequently send instructions 63 to migrate S4 to the node manager 11 of another machine, for example machine M1 (13). The node manager can then migrate 64 server S4 by starting S4 on the new machine 13, and the migrated server can begin to heartbeat again 65 against the database, as well as continue providing the singleton services.

Precautions can be taken that no previously crashed or frozen server is restarted again on the old machine 15, because that would cause two instances of server S4, and consequently two instances of every singleton service that the server is providing. These precautions can be implemented in various ways, including, but not limited to, continuously sending kill messages to the old machine 15, or isolating the old machine from the cluster.

Figure 7:
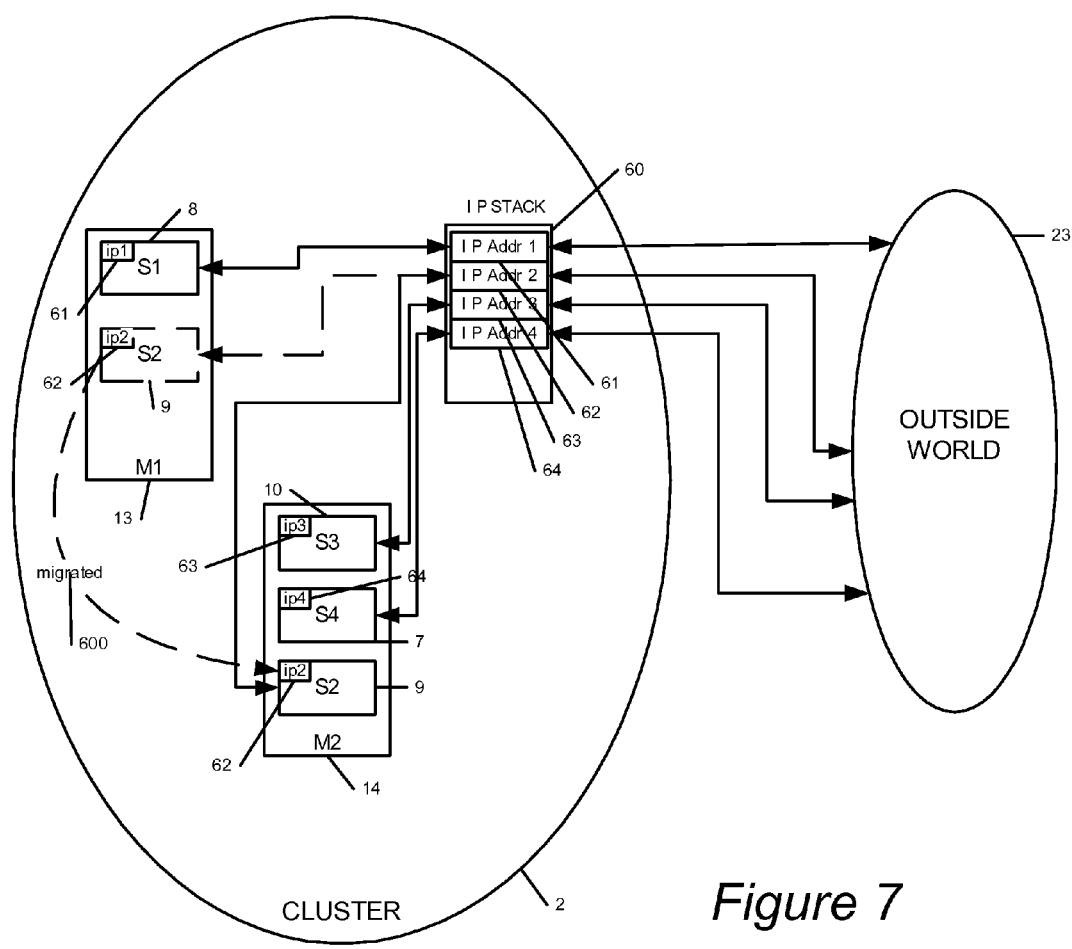
FIG. 7 is an illustration of Internet protocol (IP) address migration, in accordance with certain embodiments of the invention.

FIG. 7 is an exemplary illustration of IP migration, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

As shown in FIG. 7, all migratable servers are assigned their own internet protocol (IP) addresses (61-64). These IP addresses are usually stored in the IP stack 60. Subsequently, a server S2 (9) can be migrated in the manner previously discussed above with reference to FIG. 6. Assuming it is migrated to a different machine 14, and not restarted upon the same machine 13, then server S2 can be made to retain its original IP address IP Addr (address) 2 (62). This implementation provides an advantage over assigning new IP addresses to migrated servers, as previously discussed, in that clients in the outside world 23 need not know the IP address of the server they are trying to access. As illustrated, the IP address 62 gets migrated along with the server S2 onto the different machine 14. As used herein, the term "outside world" refers to computers or systems accessing a server that exist outside the cluster of servers.

The present invention may be conveniently implemented using a conventional general purpose or a specialized digital computer or microprocessor programmed according to the teachings of the present disclosure, as will be apparent to those skilled in the computer art. The invention may also be implemented by the preparation of integrated circuits and/or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. In particular, while the embodiments described above illustrate the use of the invention in a cluster environment, it will be evident that the techniques can also be used within other types and groupings of servers, for example a group of servers in a networked environment. Embodiments were chosen and described in order to best explain the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for providing singleton services in a cluster, the method comprising:
   providing in the cluster a plurality of machines that each run at least one server and a node manager;
   designating a first server to join the cluster to be a cluster master;
   designating one or more servers in the cluster to be migratable servers, wherein said one or more migratable servers perform a singleton service;
   periodically renewing a lease between the migratable servers and a database;

determining by the cluster master which leases of the migratable servers have expired;

wherein if a migratable server, running on a first machine, fails to renew its lease, the cluster master automatically migrates the migratable server onto a second machine by remotely invoking the node manager on the first machine, and if the cluster master cannot invoke the node manager on the first machine, then the cluster master invokes a different node manager on a different machine to migrate the migratable server from the first machine to the second machine whereby execution of the singleton service offered by the migratable server is ensured; and preventing the migratable server on the first machine that failed to renew its lease from rejoining the cluster.

2. The method of claim 1, further comprising:

renewing the lease between the cluster master and the database;

wherein the migratable servers monitor the lease of the cluster master;

wherein the first migratable server to notice the cluster master fails to renew its lease is designated a new cluster master; and wherein the cluster master is prevented from rejoining the cluster.

3. The method of claim 2 wherein the cluster master is prevented from rejoining the cluster comprises at least one of: sending a continuous kill message to the cluster master; and isolating the cluster master from the cluster.

4. The method of claim 1 wherein the node manager comprises:

scripts to facilitate server migration across machines; and
scripts to start and shutdown servers.

5. The method of claim 1 wherein the migratable server's IP address is migrated along with the migratable server.

6. The method of claim 1 wherein an administration server is employed for initially starting and stopping the servers in the cluster.

7. The method of claim 1 wherein the database employed is a highly available database comprising:

a table for storing the leases and other information about the servers in the cluster;

wherein the table can be accessed and updated by the servers in the cluster.

8. The method of claim 1 wherein the migratable server that failed to renew its lease is prevented from rejoining the cluster comprises at least one of: sending a continuous kill message to the migratable server that failed to renew its lease; and isolating the migratable server that failed to renew its lease from the cluster.

9. A system for providing singleton services in a cluster, comprising:

a database capable of storing server liveness information;
a cluster of servers comprising
a plurality of machines wherein each machine is operable to run a plurality of servers and wherein each machine includes a node manager,
a first server to join the cluster designated as a cluster master, and
one or more other servers designated as migratable servers;

wherein each migratable server in the cluster periodically renews a lease with the database in order to prove their liveness information;

wherein the cluster master monitors the leases of all migratable servers;

wherein if a first migratable server on a first machine fails to renew its lease, the cluster master automatically migrates the first migratable server to a second machine by remotely invoking the node manager on the first machine, and if the cluster master cannot invoke the node manager on the first machine, then the cluster master invokes a different node manager on a different machine to migrate the first server to the second machine; and wherein the migratable server on the first machine that failed to renew its lease is prevented from rejoining the cluster.

10. The system of claim 9 wherein:

the cluster master renews its lease with the database;

wherein migratable servers monitor the lease of the cluster master; and wherein the first migratable server to notice the cluster master fails to renew its lease is designated a new cluster master; and wherein the cluster master is prevented from rejoining the cluster.

11. The system of claim 10 wherein the cluster master is prevented from rejoining the cluster comprises at least one of: sending a continuous kill message to the cluster master; and isolating the cluster master from the cluster.

12. The system of claim 9 wherein said node manager comprises:

scripts to facilitate server migration across machines; and
scripts to start and shutdown servers.

13. The system of claim 9 wherein the migratable server's IP address is migrated along with the migratable server.

14. The system of claim 9 wherein an administration server is employed for initially starting and stopping the servers in the cluster.

15. The system of claim 9 wherein the database employed is a highly available database comprising:

a table for storing the leases and other information about the servers in the cluster;

wherein the table can be accessed and updated by the servers in the cluster.

16. The system of claim 9 wherein the migratable server that failed to renew its lease is prevented from rejoining the cluster comprises at least one of: sending a continuous kill message to the migratable server that failed to renew its lease; and isolating the migratable server that failed to renew its lease from the cluster.

17. A computer readable medium including instructions stored thereon which when executed cause the computer to perform the steps of:

providing in the cluster a plurality of machines that each run at least one server and a node manager;

designating a first server to join the cluster to be a cluster master;

designating one or more servers in the cluster to be migratable servers, wherein said one or more migratable servers perform a singleton service;

renewing a lease between the migratable servers and a database periodically;

determining by the cluster master which leases of the migratable servers have expired;

wherein if a migratable server, running on a first machine, fails to renew its lease, the cluster master automatically migrates the migratable server onto a second machine by remotely invoking the node manager on the first machine, and if the cluster master cannot invoke the node manager on the first machine, then the cluster master invokes a different node manager on a different machine to migrate the migratable server from the first machine to the second machine whereby execution of the singleton service offered by the migratable server is ensured; and preventing the migratable server on the first machine that failed to renew its lease from rejoining the cluster.

18. The computer readable medium of claim 17 wherein the migratable server that failed to renew its lease is prevented from rejoining the cluster comprises at least one of: sending a continuous kill message to the migratable server that failed to renew its lease; and isolating the migratable server that failed to renew its lease from the cluster.

19. A method for providing singleton services in a cluster, the method comprising:

providing a plurality of machines in a cluster wherein each machine runs one or more servers and wherein each machine includes a node manager;

providing a highly available database for storing liveness information;

designating one server in the cluster to be a cluster master;

designating at least one server in the cluster to be a migratable server, wherein the at least one migratable server performs a singleton service;

periodically renewing a lease between each migratable server in the cluster and the highly available database;

monitoring the leases in the highly available database by the cluster master to determine which leases have expired; and wherein if a first server on a first machine in the cluster fails to renew its lease if the first machine is operable, then the cluster master invokes a first node manager on the first machine to migrate the first server from the first machine to a second machine in the cluster, alternatively if the first machine is not operable, then the cluster master invokes a second node manager on the second machine to migrate the first server from the first machine to the second machine, and the first server on the first machine is prevented from rejoining the cluster.

* * * * *